2,966,471

PRODUCTION OF POLYMER FOAM FROM POLYMERIZED ALPHA-CHLOROACRYLIC ACID ESTERS

Harry D. Anspon, Easton, Pa., assignor to General Aniline & Film Corporation, New York, N.Y., a corporation of Delaware No Drawing. Filed Dec. 30, 1955, Ser. No. 556,427

7 Claims. (Cl. 260—2.5)

This invention relates to an improved process for the preparation of polymer foam from polymerized alpha-chloroacrylic acid esters. In accordance with U.S. Patent 2,684,341 of July 20, 1954, polymers of alpha-chloroacrylic ester of phenol or of a monohydric alcohol of one to six carbon atoms, including particularly poly-methyl-alpha-chloroacrylate, are converted on heating at temperatures from 135–225° C., and preferably 150–180° C., to a foam in which the polymer constitutes its own "blowing" agent, generating within the polymer mass gases, including an alkyl chloride (e.g., methyl chloride), forming bubbles within the polymer.

In preparation of such polymer foams, it is difficult to produce one in which the bubbles are of uniformly small size. The production of small-size bubbles is important to provide optimum insulating qualities and mechanical strength, low water vapor transmission or absorption and impermeability toward air.

It is an object of this invention to provide a medium for producing a polymer foam by heat treatment of an alpha-chloroacrylic ester polymer of the type disclosed in U.S. Patent 2,684,341, wherein the bubbles produced are uniformly small throughout the polymer mass.

A further object is to provide an improved process for producing polymer foam containing uniformly small bubbles in which the formation of such bubbles is substantially accelerated.

I have discovered that the inclusion in the monomer, i.e., in an alpha-chloroacrylic ester of a monohydroxy hydrocarbon of one to six carbon atoms, of a minor amount of an organic compound which is non-crystalline at the temperatures employed in the polymerization and which is soluble in the monomeric ester but insoluble in the corresponding polymer yields a polymer which forms uniformly small bubbles throughout the mass when heated to foaming temperature (e.g., 135–225° C.), as described in U.S. Patent 2,684,341.

The non-crystalline organic compounds employed for the aforesaid purpose in accordance with this invention include, for example, oily to waxy hydrocarbons boiling above 250° C., such as paraffin oil, petroleum wax, and oily silicones (e.g., oily dimethyl siloxane polymers).

In addition, I have discovered that alcohols, when incorporated in a monomeric alpha-chloroacrylic ester of a monohydric alcohol of one to six carbon atoms, accelerates the formation of foam from a polymer produced therefrom when it is subjected to temperatures at which polymer foam is formed. Thus, for example, it has been found that the inclusion in methyl-alpha-chloroacrylate monomer of 0.1 mol of methylisopropyl or tertiary butyl alcohol in each 100 ml. of the monomer substantially accelerates the formation of foam when a polymer produced from the solution is subjected to foaming temperature. Certain of these alcohols, particularly tertiary butyl and higher alcohols, also belong to the class of organic compounds which are soluble in the monomer but sufficiently insoluble in the polymer to separate therefrom during polymerization in finely divided form. Such alcohols are therefore adapted, not only to accelerate the formation of bubbles in the polymer, but also to render these bubbles uniformly small, as in the case of the other organic compounds enumerated above. Lower alcohols, which do not separate from the polymer, can be employed in conjunction with other organic compounds which do separate from the polymer, in order to utilize their accelerating effect upon the formation of foam, and at the same time render the bubbles produced uniformly small.

My invention will be more fully understood from the following examples:

*Example 1*

20 ml. of steam-distilled methyl-alpha-chloroacrylate were cooled to −20° C. and separated from the ice crystals which formed therein. 0.025 g. of oily dimethyl siloxane polymer (a silicone oil having a viscosity of 100° cs. at 25 C.) was added to the monomer. The resulting solution was polymerized by exposure for 4 days to diffuse daylight in a test tube. Polymerization was essentially complete at the end of the first day. The polymer thus obtained was characterized by a uniform slight haze caused by separation of the silicone oil from the polymer. The polymer was heated at 160° C. in a circulating air oven for 4 periods of one hour each and then 4 periods of two hours each, cooling to room temperature after each of the heating periods. The polymer was thereby converted to foam and expanded to approximately 27 times its original volume. The examination indicated that the bubbles in the polymer throughout the mass were uniformly small, ranging from 0.1 to 0.5 mm. in diameter.

For purposes of control, a polymer was similarly prepared from the same methyl-alpha-chloroacrylate, except that the silicone oil was omitted. This polymer sample was also heated at 160° C., as described herein, and also attained an expanded size of 27 times its original volume. However, the bubbles thereby produced were considerably larger, ranging from 1 to 2 mm. in diameter.

*Example 2*

0.1 g. of paraffin wax was dissolved in 50 ml. of vacuum-distilled methyl-alpha-chloroacrylate. The solution of the paraffin wax in the monomer was accelerated by gentle warming. The resulting solution was polymerized by exposure to diffuse daylight in a test tube under an atmosphere of nitrogen. A uniformly hazy polymer was produced, evidently by reason of separation of the paraffin wax from the polymer. The polymer was heated at 160° C. for a total of 20½ hours in a series of heating intervals (2 ¼-hour periods, 20 ½-hour periods, 8 1-hour periods, and a final 2-hour period), cooling to room temperature after each heating period. The polymer was thereupon found to have expanded to 27 times its volume. Examination indicated it consisted of a uniform foam in which the bubbles ranged in size from 0.1 to 1.0 mm. in diameter.

Similar treatment of a sample of a polymer produced from the same methyl-alpha-chloroacrylate, but without inclusion of paraffin wax, also expanded to 27 times its original volume, but the bubbles therein were found to range in size from 1 to 3 mm. in diameter.

*Example 3*

0.1 g. of paraffin oil was added to 50 ml. of vacuum-distilled methyl-alpha-chloroacrylate. The solution was then polymerized in diffuse daylight, whereby the paraffin oil separated from the polymer, yielding a uniform haze therein. The resulting polymer was heated in the same manner as in the preceding example for a total of 20½ hours at 160° C. The foamed polymer, which had expanded to 27 times its original volume, consisted of bubbles having 0.1–1.0 mm. diameter.

*Example 4*

A solution of 228 g. of tertiary butyl alcohol in 3,705 g. of vacuum-distilled methyl-alpha-chloroacrylate containing 2.38 g. of dibutyl tin diacetate as a polymerization catalyst and 1.97 g. of a dimethyl siloxane polymer oil as a mold adhesive was polymerized at room temperature in a casting cell of plate glass to a ½" thick polymer sheet. Polymerization was completed, after 5 days at room temperature, by heating at 120° C. for 4¾ hours. A uniform haze prepared in the polymer by reason of separation of tertiary butyl alcohol. A portion of the resulting sheet was heated in a circulating air oven at 160° C. for a period of ½-hour and two successive periods of one hour each, cooling to room temperature after each heating period. The sample was found to have expanded to 27 times its original volume and was composed of bubbles from 0.2 to 1.0 mm. in diameter.

Another sample of the same sheet was heated in a perforated metal box by immersion in a mineral oil bath maintained at 162° C. for 3 periods of ½-hour each and cooled after each heating period. At the end of this opeartion, the sample was found to have expanded to approximately 26 times its original volume and was composed of bubbles from 0.2 to 1.0 mm. in diameter.

*Example 5*

Three solutions were prepared, each containing 100 ml. of vacuum-distilled methyl-alpha-chloroacrylate monomer with 0.1 mol, respectively, of methyl alcohol, isopropyl alcohol, and tertiary butyl alcohol. Each of these solutions was divided into halves and there was added to one half enough of the dimethyl siloxane polymer oil employed in Example 1 to produce haziness in the resulting polymer. In the case of the sample containing methyl alcohol, there was added 0.186 g., to the sample containing isopropyl alcohol, 0.05 g., and to the sample containing tertiary butyl alcohol, 0.037 g. of silicone oil. The six samples were polymerized by exposure to diffuse daylight in the absence of air, and subjected to final curing at 120° C. Samples containing only methyl alcohol or isopropyl alcohol were clear, while those containing tertiary butyl alcohol and/or dimethyl siloxane polymer were hazy. The six samples were heated at 160° C. in an air oven until they expanded to foam having 27 times the original volume. Finer bubbles were produced in each of the samples containing silicone oil and additionally in the sample containing tertiary butyl alcohol with the silicone oil. Larger bubbles appeared in the polymers containing only methyl alcohol and only isopropyl alcohol.

The polymers in which the improvements herein described are effective are of alpha-chloroacrylic acid esters of the monohydroxy hydrocarbons of one to six carbon atoms, i.e., esters of monohydric alcohols of one to six carbon atoms or of phenol.

The organic compounds which promote formation of small bubbles are incorporated in the corresponding monomers in proportions amounting to 0.01–1% in the case of those which separate substantially completely from solution during polymerization (e.g., paraffin oil or wax or oily siloxane polymers). In the case of alcohols such as tertiary butanol which retain some solubility in the polymer but are of sufficiently limited solubility to separate during polymerization, the proportion added may be as high as 8%.

Monohydric alcohols added for the purpose of accelerating bubble formation during foaming of the polymer are alcohols of one to five carbon atoms and are used in proportions ranging from 1–8% of the monomer.

The improving agents of this invention are dissolved in the alpha-chloroacrylic ester monomer before its polymerization, and polymerization is then carried out by known methods, e.g., by exposure to ultra-violet light or inclusion in the monomer of a polymerization catalyst such as an organic peroxide (e.g., perbenzoic acid or ditertiary butyl peroxide) or other catalysts liberating free radicals such as dibutyl tin diacetate. Polymerization may be accelerated by raising the temperature, e.g., to 120° C.

After polymerization, the polymerized alpha-chloroacrylic ester from which the added organic compound which promotes small bubble formation separates in the form of a haze is subjected to foaming treatment by heating at temperatures from 135–225° C., at which the polymer begins to decompose but remains in plastic condition. Preferred temperatures range from 150–180° C., especially for polymers of methyl-alpha-chloroacrylate. The heat treatment for foaming can be carried out by immersion in an inert high boiling liquid heated to the desired temperature or by exposure to hot vapors or by conduction or irradiation with infra-red rays. Uniform foaming is also favored by intermittently cooling the polymer during the foaming treatment and re-heating after such cooling periods to foaming temperature. The bubbles produced in polymer foams obtained on heating a polymerized ester of alpha-chloroacrylic esters containing an organic compound of the type specified herein generally range in size from 0.1–1 mm. in diameter. The formation of foam is accelerated several-fold by the inclusion in a monomeric alpha-chloroacrylic ester of a monohydric alcohol of one to five carbon atoms, as hereinabove described, such that it remains in the corresponding polymer.

Variations and modifications, which will be obvious to those skilled in the art, can be made in the procedures hereinabove described and illustrated without departing from the scope or spirit of the invention.

I claim:

1. A process for making polymer foam which comprises dissolving in a monomeric alpha-chloroacrylic ester of a mono-hydroxy hydrocarbon of 1 to 6 carbon atoms, an organic compound which is soluble in such monomer but sufficiently insoluble in the corresponding polymer to separate therefrom during polymerization in non-crystalline dispersed form and which is selected from the group consisting of oily to waxy hydrocarbons boiling above 250° C. and oily dimethyl siloxane polymers, amounting to from 0.01 to 1% by weight of the resulting solution, polymerizing the monomer solution to a solid polymer, heating the latter at a decomposition temperature from 135 to 235° C. to generate bubbles within the mass and cooling below said temperature range before a substantial portion of the bubbles merge within the mass and before a substantial portion of the bubbles escape from its surface.

2. A process as defined in claim 1, in which there is included in the monomer at least one monohydric alcohol of one to five carbon atoms in an amount from 1–8% by weight of the mixture.

3. A process as defined in claim 1, in which the monomer is methyl-alpha-chloroacrylate, the foaming temperature being from 150–180° C.

4. A process as defined in claim 3, wherein the organic compound is paraffin oil in an amount from 0.01–1% by weight of the mixture.

5. A process as defined in claim 3, wherein the organic compound is paraffin wax in an amount from 0.01–1% by weight of the mixture.

6. A process as defined in claim 3, wherein the organic compound added is an oily dimethyl siloxane polymer in an amount from 0.01–1% by weight of the mixture.

7. A process for making polymer foam which comprises dissolving in a monomeric alpha-chloroacrylic ester of a monohydroxy hydrocarbon of one to six carbon atoms, tertiary butyl alcohol in an amount from 1–8% by weight of the resulting solution, polymerizing the resulting monomer solution to a solid polymer, heating the latter at a decomposition temperature from 135–225° C. to generate bubbles within the mass, and cooling below said temperature range before a substantial portion of the bubbles merge within the mass and before a substantial portion of the bubbles escape from its surface.

References Cited in the file of this patent

UNITED STATES PATENTS 2,684,341    Anspon et al. _____ July 20, 1954